UNITED STATES PATENT OFFICE

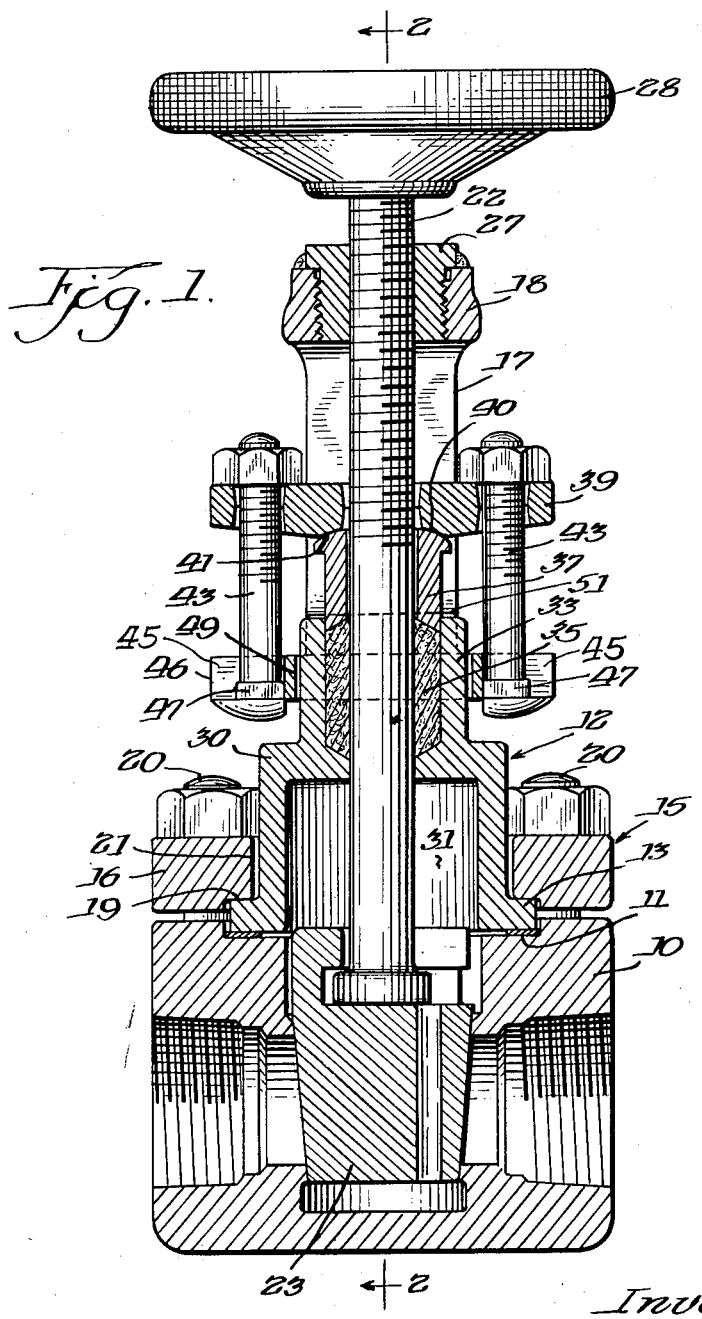

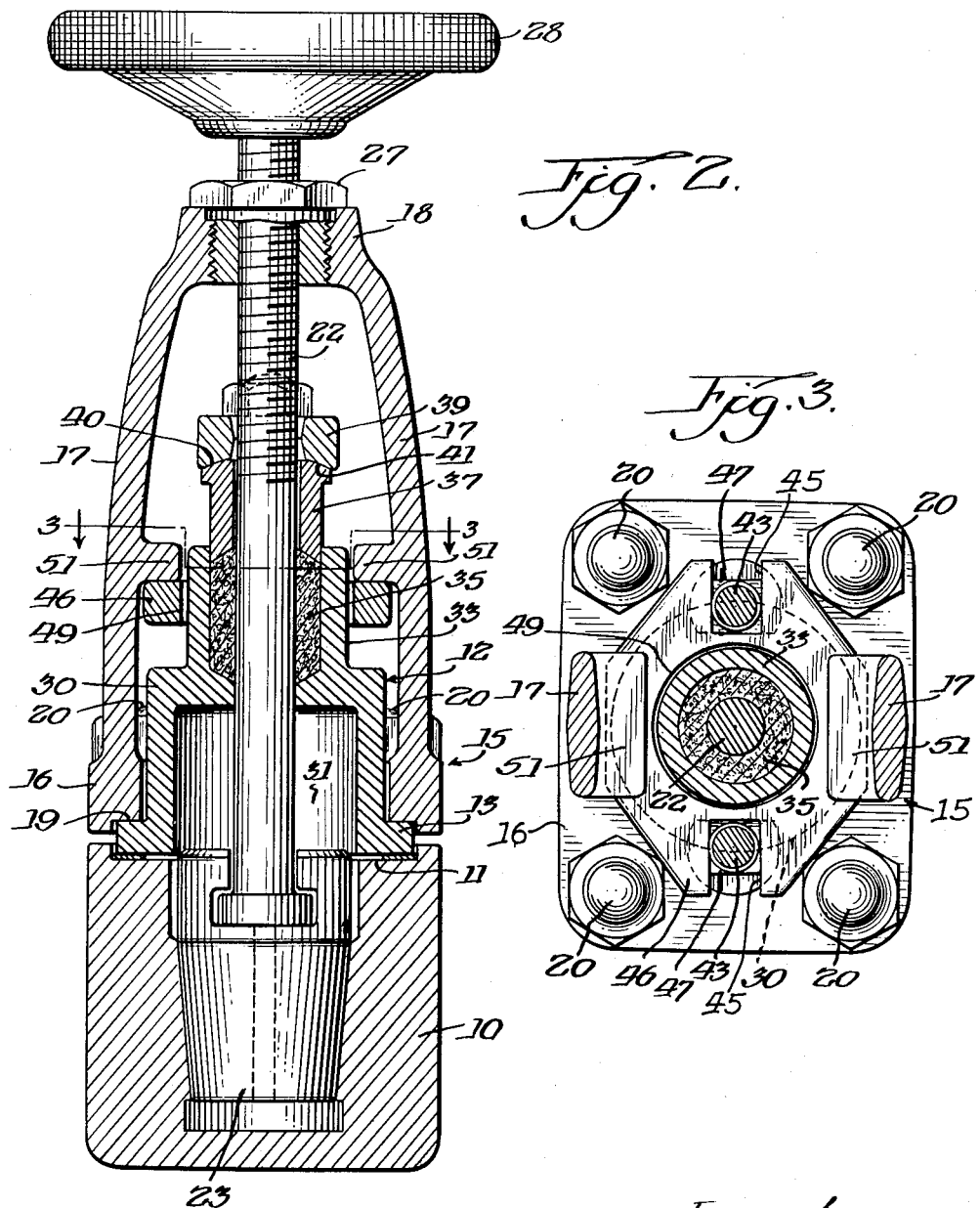

2,722,401
PACKING COMPRESSION MEANS

Robert A. Till, Chicago, Chester Anderson, Berwyn, and Ivan J. Acosta, Chicago, Ill., assignors to Crane Co., Chicago, Ill., a corporation of Illinois Application April 16, 1954, Serial No. 423,561

5 Claims. (Cl. 251—214)

This invention relates to valves, and more particularly, it pertains to valves known to those skilled in the art as the outside screw yoke type.

Although only illustrative of the present invention, the valve disclosed in the following specification and accompanying drawing is constructed for the control and transmission of highly corrosive fluids and includes the use in its construction of extremely non-corrosive metals, such as zirconium or titanium. Since these metals are relatively difficult to obtain and therefore quite expensive, their use is restricted in the valve construction to parts coming into direct contact with the fluids. Thus, a composite construction is provided in this form.

To facilitate the making of these parts and to avoid any stressed projections which may be subject to possible failure, overhanging portions receiving substantial loading have been eliminated.

Particularly characteristic of the present invention is the use of a stepped cylindrical bonnet loosely received within a unitary yoke and clamp plate member and held in clamped relation with the body by engagement of the plate portion with the lower step or flanged portion of the bonnet.

A further characteristic of the invention is the use of a separate bolt flange or ring member unattached to the bonnet and providing clearance between the same and an upper reduced portion of the bonnet, the flange member being retained against upward movement as the gland bolts are tightened by a pair of lugs projecting inwardly from the yoke arms and engaging the flange member at opposite ends thereof. The stress is therefore taken by the yoke arms through the lugs rather than by the bonnet.

Other distinctions and objectives will be more readily apparent upon proceeding with the following description read in the light of the accompanying drawings, in which:

Fig. 1 is a sectional assembly view of a valve construction embodying our invention.

Fig. 2 is a similar view on line 2—2 of Fig. 1.

Fig. 3 is a cross-section on line 3—3 of Fig. 2.

Similar reference numerals refer to similar parts throughout the several views.

Referring to the above figures in greater detail, the valve body 10 shown in Fig. 1 is annularly recessed at 11 for reception of the bonnet 12, the latter being flanged at the lower end portion 13 for extending around the bonnet and securing the latter member to the body in clamped relation is the yoke generally designated 15 including a base or flanged portion 16 and having upwardly extending yoke arms 17, the latter being joined at the top as at 18. The base preferably has a recess 19 which is complementary to the recess in the body for reception of the upper part of the flange 13, the flange being drawn into fluid tight relation with the body by means of the nuts at the upper ends of the studs 20 extending from the body through the base. As shown in the drawing, the clamp plate or base portion of the unit is recessed at 21 for projection of the bonnet therethrough.

Extending through the bonnet is the valve stem 22 to the lower end of which is attached a reciprocally movable closure member, here shown as a tapered plug 23, and which is threaded along its upper portion for threaded engagement with the nut portion 27, here shown as a separate bushing mounted within the connecting portion 18 of the yoke arms 17. The usual handwheel 28 surmounts the valve stem 22 for rotating of said stem and effecting consequent reciprocal movement of the plug into valve open and closed positions.

The bonnet 12 is of stepped cylindrical formation having a lower flanged portion 30 with a chamber 31 for receiving the valve plug in the open valve position and a reduced upper portion 33 forming a stuffing box for the valve stem. The stuffing box portion is formed to contain the usual packing 35 around the stem.

An annular gland 37 is positioned above the packing to retain the same and exert compression thereon in order to effect a fluid tight seal around the stem. Extending across the gland member is the gland flange 39 adapted to bear on the top of the gland member for aiding in the compression of the packing. In this connection, the top of the gland is rounded at 40 and the underpart of the flange concave at 41 for swivel action between the two during tightening of the flange. The bolts 43 extend through the gland flange for this tightening, being secured within the slots 45 of the bolt flange 46. Carriage bolts are preferred, which are prevented from turning within slots by the square shank portions 47. Should corrosion take place making it difficult to disassemble the valve or renew the packing without cutting through the bolts, the latter may be easily replaced as compared with the usual pin mounted eye-bolts.

One of the principal features of the valve is that it may be used to conduct highly corrosive fluids and in order to accomplish this non-corrosive metals of a relatively high order, such as titanium or zirconium, are employed for certain parts. Since these metals are relatively difficult to obtain and consequently quite expensive, the same is exclusively used for those parts normally coming in contact with the corrosive fluid. In the present instance, the valve body 10, bonnet 12, valve plug 23, stem 22, and gland 37 are of titanium, while the remaining parts are principally of steel and stainless steel.

An important distinction of the present construction over the prior art is found in the formation and manner of attaching the bolt flange 46 for drawing up of the bolts 43. Instead of being formed integrally with the bonnet as oppositely disposed ears or projections or as a piece for threaded attachment thereto, this member according to the present construction loosely receives and extends around the bonnet providing for some degree of clearance at 49, while extending laterally under a pair of projections or lugs 51 extending inwardly from each of the yoke arms 17, which secure them against upward movement as illustrated.

This arrangement not only conserves the amount of titanium used, the ring or flange member 46 being of other metal, but permits the bonnet which is of titanium to be easily fabricated from bar stock. Further, and of even more importance, the bonnet has no projecting portions, flange or threaded member attached thereto, which is subject to stressing by tightening of the bolts 43 and possible failure. The stress is thus taken directly by the yoke arm rather than the bonnet which remains substantially free of stress, being merely clamped between the yoke assembly and body.

The bolt flange 46 is of simple polygonal or ring-like form and is easily assembled or replaced by mere endwise movement when the yoke unit 15 is raised slightly from the body and the bolts 43 loosened.

Nov. 1, 1955 R. R. CROOKSTON 2,722,402
VALVE SEALING DEVICE
Filed Aug. 5, 1949
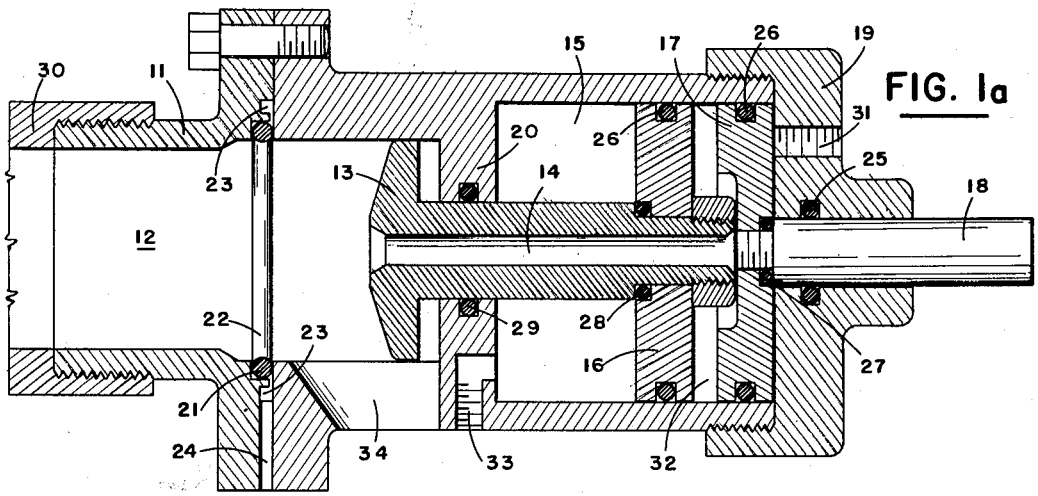
FIG. 1a.
FIG. 1b.
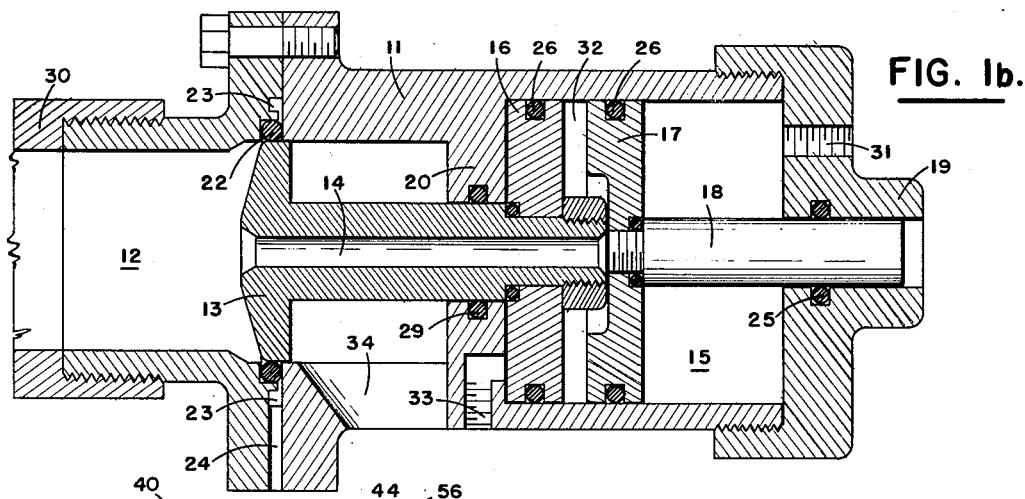
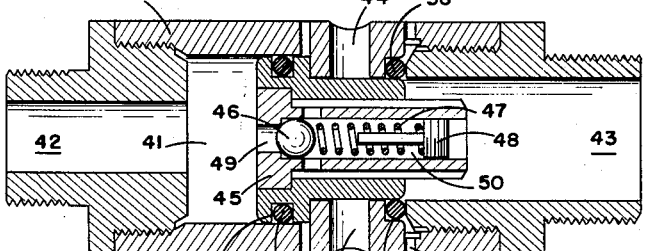
FIG. 2a.
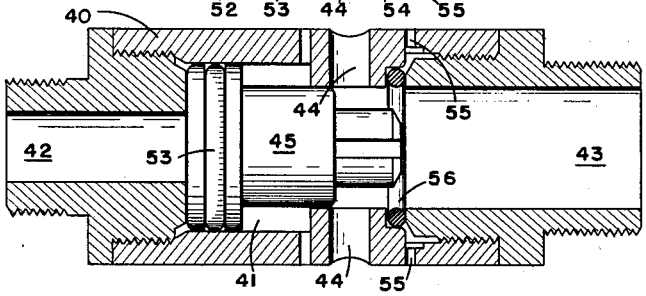
FIG. 2b.
Robert R. Crookston,
INVENTOR.
BY
AGENT.